United States Patent
Liu et al.

(10) Patent No.: US 11,194,536 B2
(45) Date of Patent: Dec. 7, 2021

(54) IMAGE PROCESSING METHOD AND APPARATUS FOR DISPLAYING AN IMAGE BETWEEN TWO DISPLAY SCREENS

(71) Applicant: XI'AN ZHONGXING NEW SOFTWARE CO., LTD., Shaanxi (CN)

(72) Inventors: Dongmei Liu, Shenzhen (CN); Fengpeng Liu, Shenzhen (CN); Song Dang, Shenzhen (CN); Xipeng Li, Shenzhen (CN); Jiani Zhang, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 0 days.

(21) Appl. No.: 16/755,408

(22) PCT Filed: Jul. 9, 2018

(86) PCT No.: PCT/CN2018/095006
§ 371 (c)(1),
(2) Date: Apr. 10, 2020

(87) PCT Pub. No.: WO2019/071990
PCT Pub. Date: Apr. 18, 2019

(65) Prior Publication Data
US 2020/0272399 A1     Aug. 27, 2020

(30) Foreign Application Priority Data

Oct. 11, 2017   (CN) .......................... 201710941751.7

(51) Int. Cl.
*G06F 3/14*     (2006.01)
*G06T 7/13*     (2017.01)
(Continued)

(52) U.S. Cl.
CPC .......... *G06F 3/1423* (2013.01); *G06T 3/0075* (2013.01); *G06T 3/40* (2013.01); *G06T 7/13* (2017.01); *G06T 11/40* (2013.01)

(58) Field of Classification Search
None
See application file for complete search history.

(56) References Cited

U.S. PATENT DOCUMENTS

2002/0021296 A1     2/2002   Tsuji
2011/0115927 A1*    5/2011   Jang .................... H04N 5/23254
                                                              348/208.1
(Continued)

FOREIGN PATENT DOCUMENTS

CN    103076967 A       5/2013
CN    103679636 A   *   3/2014
(Continued)

OTHER PUBLICATIONS

International Search Report for corresponding application PCT/CN2018/095006 filed Jul. 9, 2018; dated Sep. 29, 2018.

*Primary Examiner* — Patrick F Valdez
(74) *Attorney, Agent, or Firm* — Cantor Colburn LLP

(57) ABSTRACT

Disclosed is an image processing method. The method includes: determining that an original image is to be displayed on a dividing line between two display screens; acquiring a complete display picture of the original image, and calculating distances from boundaries of the original image to the dividing line; and adjusting a display position of the original image on the two display screens according to the distances, and displaying the complete display picture of the original image according to the adjusted display position. Further disclosed are an image processing apparatus, a storage medium and a processor.

17 Claims, 9 Drawing Sheets

(51) Int. Cl.
*G06T 3/00* (2006.01)
*G06T 3/40* (2006.01)
*G06T 11/40* (2006.01)

(56) References Cited

U.S. PATENT DOCUMENTS

2012/0081303 A1   4/2012  Cassar
2012/0242685 A1*  9/2012  Ohtake ................ G06F 3/1446
                                                345/619
2020/0225899 A1*  7/2020  Lim .................... G06F 3/1423

FOREIGN PATENT DOCUMENTS

| CN | 103985373 A | 8/2014 |
| CN | 104391666 A | 3/2015 |
| CN | 106959833 A | 7/2017 |

* cited by examiner

IMAGE PROCESSING METHOD AND APPARATUS FOR DISPLAYING AN IMAGE BETWEEN TWO DISPLAY SCREENS

CROSS-REFERENCE TO RELATED APPLICATIONS

This is a National Stage Application, filed under 35 U.S.C. 371, of International Patent Application No. PCT/CN2018/095006, filed on Jul. 9, 2018, which claims priority to Chinese patent application No. 201710941751.7 filed on Oct. 11, 2017, contents of both of which are incorporated herein by reference in their entireties.

TECHNICAL FIELD

The present disclosure relates to the technical field of communications and, for example, to an image processing method and apparatus.

BACKGROUND

In the related art, since it is impossible to achieve seamless connection at the junction of two screens of a double-screen mobile phone, the image displayed at the gap between the two screens is not attractive in display, is inconvenient to operate and is poor in user experience due to the existence of the gap. For example, 5 persons exist in an image and a main character is in a gap between two screens and divided to be displayed on two screens, or a main item is divided to be displayed on two screens, or in an application, for example a piano key is just displayed at the gap between the two screens, or a display picture of a caller portrait is at the gap between the two screens, resulting in a very poor display effect and inconvenience for a user to use.

With the increasing popularity of the use of double-screen mobile phones, a higher requirement for image display will be imposed. At present, in the case where the double-screen mobile phone is in a large-screen mode, for processing of an image at the gap between the two screens, the image is displayed mainly on one of the screens rather than enlarged for display on the two screens.

For example, for application of the photos, the common processing method at present is to display preview images on one screen and a large image of a clicked preview image on the other screen. In this way, the image can be avoided from being displayed at the gap between the two screens. This display method does not enlarge the image for display and is actually to display a large image on a single screen. For other applications, this processing method is also mainly used to display the complete image merely on one screen. However, this processing method has obvious defects of failing to fully utilize the advantage of displaying an image on a large screen, still displaying an image by using a single screen and being incapable of displaying a complete image by using double screens to achieve good visual effects.

SUMMARY

Embodiments of the present application provide an image processing method and apparatus.

An embodiment provides an image processing method. The method includes: determining that an original image is to be displayed on a dividing line between two display screens; acquiring a complete display picture of the original image, and calculating distances from boundaries of the original image to the dividing line; and adjusting a display position of the original image on the two display screens according to the distances, and displaying the complete display picture of the original image according to the adjusted display position.

In an embodiment, the two display screens are a first display screen and a second display screen, respectively.

The step of determining that the original image is to be displayed on the dividing line between the two display screens includes: plotting a first filling area of a predetermined size on the first display screen and plotting a second filling area of a predetermined size on the second display screen; calculating similarity of a first pixel point in the first filling area and a second pixel point in the second filling area; and in response to determining that the similarity is smaller than a preset threshold value, determining that the original image is to be displayed on the dividing line between the first display screen and the second display screen.

In an embodiment, the first pixel point and the second pixel point are pixel points symmetrical with respect to the dividing line as a center line.

In an embodiment, the step of acquiring the complete display picture of the original image includes: using an edge detection method to calculate edge areas of the original image on two sides of the dividing line, restore display pictures of the original image in the edge areas on the two sides of the dividing line, and splice the display pictures to obtain the complete display picture of the original image.

In an embodiment, the step of calculating the distances from the boundaries of the original image to the dividing line includes: separately determining a first boundary of the original image on a first display screen and a second boundary of the original image on a second display screen; and calculating a first farthest distance among distances from all pixel points on the first boundary to the dividing line, and calculating a second farthest distance among distances from all pixel points on the second boundary to the dividing line.

In an embodiment, the step of adjusting the display position of the original image on the two display screens according to the distances, and displaying the complete display picture of the original image according to the adjusted display position include one of: moving, according to the calculated second farthest distance, the display position of the original image on the two display screens towards the first display screen by the second farthest distance so that the complete display picture of the original image is displayed on the first display screen; moving, according to the calculated first farthest distance, the display position of the original image on the two display screens towards the second display screen by the first farthest distance so that the complete display picture of the original image is displayed on the second display screen; zooming out the original image by D1/(D1+D2), and displaying the complete display picture of the original image on the first display screen; or zooming out the original image by D2/(D1+D2), and displaying the complete display picture of the original image on the second display screen; where D1 is the first farthest distance and D2 is the second farthest distance.

Another embodiment of the present application provides an image processing apparatus. The apparatus includes a determination module, a calculation module and an adjustment module. The determination module is configured to determine that an original image is to be displayed on a dividing line between two display screens. The calculation module is configured to acquire a complete display picture of the original image, and calculate distances from boundaries of the original image to the dividing line. The adjustment module is configured to adjust a display position of the original image on the two display screens according to the distances, and display the complete display picture of the original image according to the adjusted display position.

In an embodiment, the two display screens are a first display screen and a second display screen, respectively; the determination module includes: a plotting unit, a first calculation unit, and a first determination unit; the plotting unit is configured to plot a first filling area of a predetermined size on the first display screen and plot a second filling area of a predetermined size on the second display screen; the first calculation unit is configured to calculate similarity of a first pixel point in the first filling area and a second pixel point in the second filling area; and the first determination unit is configured to: in response to determining that the similarity is smaller than a preset threshold value, determine that the original image is to be displayed on the dividing line between the first display screen and the second display screen.

In an embodiment, the original image is a partial image included in a large-screen display image and divided at the dividing line between the two display screens, and the large-screen display image is an image displayed on the two display screens.

In an embodiment, the calculation module includes a second determination unit and a second calculation unit. The second determination unit is configured to separately determine a first boundary of the original image on a first display screen and a second boundary of the original image on a second display screen; the second calculation unit is configured to calculate a first farthest distance among distances from all pixel points on the first boundary to the dividing line, and calculate a second farthest distance among distances from all pixel points on the second boundary to the dividing line.

In an embodiment, the adjustment module includes one of: a first adjustment unit, a second adjustment unit, a third adjustment unit or a fourth adjustment unit; the first adjustment unit is configured to move the display position of the original image on the two display screens towards the first display screen by the second farthest distance according to the calculated second farthest distance so that the complete display picture of the original image is displayed on the first display screen; the second adjustment unit is configured to move the display position of the original image on the two display screens towards the second display screen by the first farthest distance according to the calculated first farthest distance so that the complete display picture of the original image is displayed on the second display screen; the third adjustment unit is configured to zoom out the original image by D1/(D1+D2) and display the complete display picture of the original image on the first display screen; the fourth adjustment unit is configured to zoom out the original image by D2/(D1+D2) and display the complete display picture of the original image on the second display screen; where D1 is the first farthest distance and D2 is the second farthest distance.

An embodiment further provides a storage medium. The storage medium is configured to store program codes for performing the steps described below.

It is determined that an original image is to be displayed on a dividing line between two display screens.

A complete display picture of the original image is acquired, and distances from boundaries of the original image to the dividing line are calculated.

A display position of the original image on the two display screens is adjusted according to the distances, and the complete display picture of the original image is displayed according to the adjusted display position.

An embodiment further provides a processor. The processor is configured to execute programs which, when executed, execute the method described above.

Herein, the complete picture of the original image is obtained through calculation and is displayed after the display position of the original image on the two display screens is adjusted, so that the original image is displayed by avoiding the dividing line between the two display screens, and improving the user experience.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way.

DETAILED DESCRIPTION

Embodiments of the present application will be described hereinafter in detail with reference to the drawings and in conjunction with embodiments.

In an embodiment, the terms "first", "second" and the like in the description, claims and above drawings of the present application are used to distinguish between similar objects and are not necessarily used to describe a particular order or sequence.

Embodiment One

Figure 1:
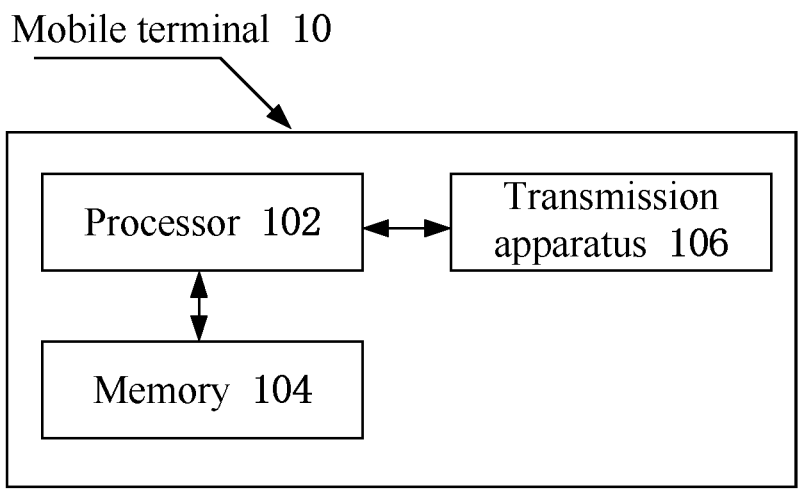
FIG. 1 is a block diagram of a hardware structure of a mobile terminal for an image processing method according to an embodiment of the present application.

A method embodiment provided by embodiment one of the present application may be executed in a mobile terminal, a computer terminal or other similar computing apparatuses. Taking the method to be executed in the mobile terminal as an example, FIG. 1 is a block diagram of a hardware structure of a mobile terminal for an image processing method according to an embodiment of the present application. As shown in FIG. 1, a mobile terminal 10 may include one or more (merely one is shown in the figure) processors 102 (the processor 102 may include, but is not limited to, a processing apparatus such as a micro controller unit (MCU) or a field-programmable gate array (FPGA)), a memory 104 configured to store data, and a transmission apparatus 106 implementing a communication function. It may be understood by those skilled in the art that the structure shown in FIG. 1 is merely illustrative, and not intended to limit the structure of the electronic apparatus described above. For example, the mobile terminal 10 may further include more or fewer components than the components shown in FIG. 1, or may have a configuration different from the configuration shown in FIG. 1.

The memory 104 may be configured to store software programs and modules of application software, such as program instructions/modules corresponding to the image processing method in the embodiments of the present application. The processor 102 executes the software programs and modules stored in the memory 104 to perform multiple functional applications and data processing, that is, to implement the method described above. The memory 104 may include a high-speed random access memory, or may further include a nonvolatile memory such as one or more magnetic storage apparatuses, flash memories or other nonvolatile solid-state memories. In some examples, the memory 104 may further include memories that are disposed remote from the one or more processors 102. These remote memories may be connected to the mobile terminal 10 via a network. Examples of the above network include, but are not limited to, the Internet, an intranet, a local area network, a mobile communication network and a combination thereof.

The transmission apparatus 106 is configured to receive or send data via a network. Specific examples of the above network may include a wireless network provided by a communication provider of the mobile terminal 10. In one example, the transmission apparatus 106 includes a network interface controller (NIC), which may be connected to other network devices via a base station and thus is capable of communicating with the Internet. In one example, the transmission apparatus 106 may be a radio frequency (RF) module, and is configured to communicate with the Internet in a wireless way.

Figure 2:
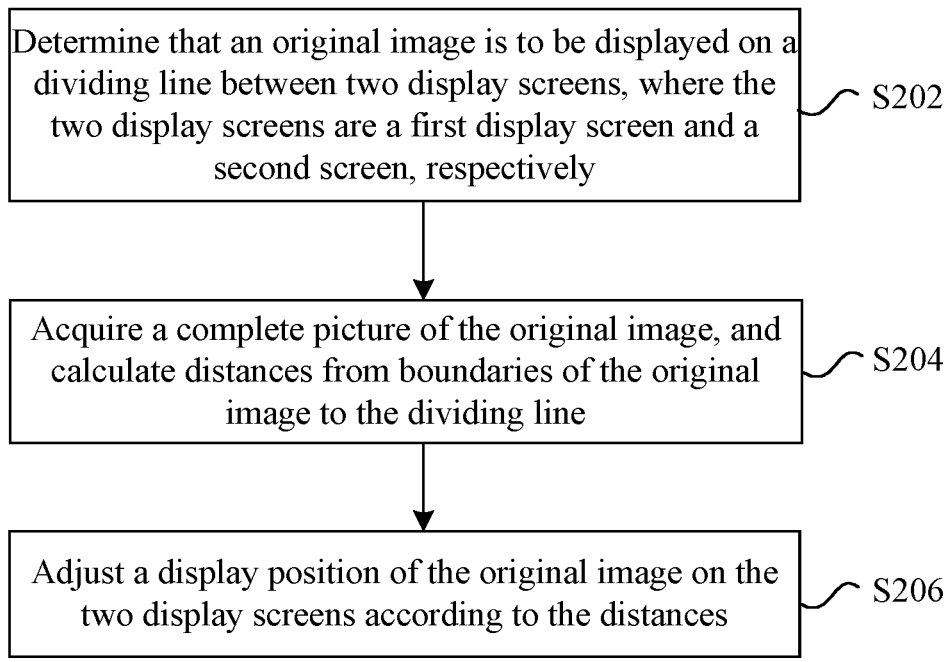
FIG. 2 is a flowchart of an image processing method according to an embodiment of the present application.

An embodiment provides an image processing method. FIG. 2 is a flowchart of an image processing method according to an embodiment of the present application. As shown in FIG. 2, the process of the method includes the steps described below.

In step S202, it is determined that an original image is to be displayed on a dividing line between two display screens, where the two display screens are a first display screen and a second screen, respectively.

In step S204, a complete picture of the original image is acquired, and distances from boundaries of the original image to the dividing line are calculated.

In step S206, a display position of the original image on the two display screens is adjusted according to the distances.

Through the above steps, the complete picture of the original image is obtained through calculation and is displayed after the display position of the original image on the two display screens is adjusted, so that the dividing line between the two display screens is avoided, and improving the user experience.

In an embodiment, the above steps may, but may not necessarily, be executed by a terminal having at least two display screens.

In an embodiment, the step of determining that an original image is to be displayed on a dividing line between two display screens includes steps described below.

In S11, a first filling area of a predetermined size is plotted on the first display screen and a second filling area of a predetermined size is plotted on the second display screen.

In S12, similarity of a first pixel point in the first filling area and a second pixel point in the second filling area is calculated.

In S13, in response to determining that the similarity is smaller than a preset threshold value, it is determined that the original image is to be displayed on the dividing line between the two screens.

In an embodiment, the first pixel point and the second pixel point are pixel points symmetrical with respect to the dividing line as a center line. The first pixel points or the second pixel points may be a plurality of adjacent pixel points, such as the same column or the same row of pixel points.

In an embodiment, the step of acquiring the complete picture of the original image includes using an edge detection method to perform the following operations: calculating edge areas of the original image at the dividing line, restoring pictures of the original image in the edge areas, and splicing the pictures to obtain the complete picture of the original image.

In an embodiment, the step of calculating the distances from the boundaries of the original image to the dividing line includes the steps described below.

In S21, a first boundary of the original image on a first display screen and a second boundary of the original image on a second display screen are determined separately.

In S22, a first farthest distance from the first boundary to the dividing line is calculated, and a second farthest distance from the second boundary to the dividing line is calculated.

In an embodiment, the step of adjusting the display position of the original image on the two display screens according to the distances, which may be moving the display position or zooming out the original image, may include one of the following:

the display position of the original image on the two display screens is moved towards the first display screen by the second farthest distance;

the display position of the original image on the two display screens is moved towards the second display screen by the first farthest distance;

the original image is zoomed out by D1/(D1+D2), and then displayed on the first display screen; or the original image is zoomed out by D2/(D1+D2), and then displayed on the second display screen.

D1 is the first farthest distance and D2 is the second farthest distance.

From the description of the above-mentioned embodiments, it will be apparent to those skilled in the art that the methods in the embodiments described above may be implemented by software plus a necessary general-purpose hardware platform, or may of course be implemented by hardware. Based on this understanding, the present application substantially, or the part making contributions, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to one or more embodiments of the present application.

Embodiment Two

An embodiment further provides an image processing apparatus. The apparatus is configured to implement the above-mentioned embodiments and other embodiments. What has been described will not be repeated. As used below, the term "module" may be software, hardware or a combination thereof capable of implementing predetermined functions. The apparatus in the embodiment described below may be implemented by software, but implementation by hardware or by a combination of software and hardware is also possible and conceivable.

Figure 3:
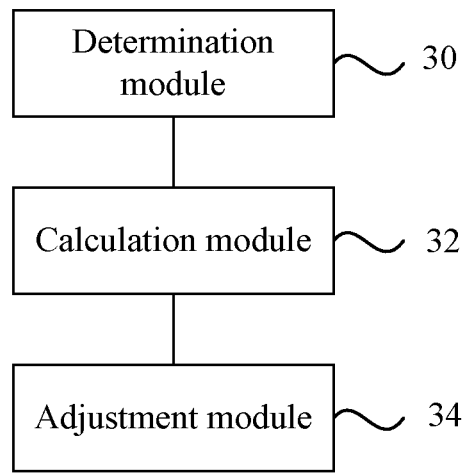
FIG. 3 is a structural block diagram of an image processing apparatus according to an embodiment of the present application.

FIG. 3 is a structural block diagram of an image processing apparatus according to an embodiment of the present application. As shown in FIG. 3, the apparatus includes a determination module 30, a calculation module 32 and an adjustment module 34.

The determination module 30 is configured to determine that an original image is to be displayed on a dividing line between two display screens, where the two display screens are a first display screen and a second screen, respectively.

The calculation module 32 is configured to acquire a complete picture of the original image, and calculate distances from boundaries of the original image to the dividing line.

The adjustment module 34 is configured to adjust a display position of the original image on the two display screens according to the distances.

In an embodiment, the determination module includes: a plotting unit, a first calculation unit, and a first determination unit; the plotting unit is configured to plot a first filling area of a predetermined size on the first display screen and plot a second filling area of a predetermined size on the second display screen; the first calculation unit is configured to calculate similarity of a first pixel point in the first filling area and a second pixel point in the second filling area; the first determination unit is configured to: in response to determining that the similarity is smaller than a preset threshold value, determine that the original image is displayed on the dividing line between the two display screens.

In an embodiment, the calculation module includes a second determination unit and a second calculation unit. The second determination unit is configured to separately determine a first boundary of the original image on a first display screen and a second boundary of the original image on a second display screen; the second calculation unit is configured to calculate a first farthest distance from the first boundary to the dividing line, and calculate a second farthest distance from the second boundary to the dividing line.

In an embodiment, the adjustment module includes one of: a first adjustment unit, a second adjustment unit, a third adjustment unit or a fourth adjustment unit; the first adjustment unit is configured to move the display position of the original image on the two display screens towards the first display screen by the second farthest distance; the second adjustment unit is configured to move the display position of the original image on the two display screens towards the second display screen by the first farthest distance; the third adjustment unit is configured to zoom out the original image by D1/(D1+D2) for display on the first display screen; the fourth adjustment unit is configured to zoom out the original image by D2/(D1+D2) for display on the second display screen; where D1 is the first farthest distance and D2 is the second farthest distance.

In an embodiment, the one or more modules described above may be implemented by software or hardware. Implementation by the hardware may, but may not necessarily, be performed in the following manner: the one or more modules described above are located in the same processor or located in their respective processors in any combination form.

Embodiment Three

This embodiment is an embodiment of the present application, used for describing the present application in detail in conjunction with examples.

The embodiment is directed to the double-screen image display from the display on merely one screen without avoiding the gap to the display on the large screen with the gap. As such, the present application uses area plotting, coordinate system marking, image scanning, pixel calculation, and a comparison of pixel values in the coordinate system to preliminarily determine that in a large-screen mode, one image is divided on two screens between which a gap exists, determine the divided complete image by using edge detection, calculate the distances between the divided image and the gap between the two screens by using coordinates, and move or zoom out the image according to the distances. According to the present disclosure, the image can be displayed on the large screen with the gap between the two screens avoided, the advantage of displaying the image on the large screen is achieved, and the defect that a main character or item is divided by the gap between the two screens can be avoided.

With the wide use of double-screen mobile phones, the advantages of displaying an image, a video and the like on a large screen are also outstanding, which is mainly applied in applications such as photos, camera, audio, video, and third-party games. These applications involve the image division and display due to the existence of the gap between two screens. The present application will use the following related art: the present application uses area plotting, coordinate system marking, image scanning, pixel calculation, and a comparison of pixel values in the coordinate system to preliminarily determine that in a large-screen mode, one image is divided on two screens between which a gap exists, determine the divided complete image by using edge detection, calculate the distances between the divided image and the gap between the two screens by using coordinates, and move or zoom out the image according to the distances.

For a double-screen terminal (terminal equipment can be turned over), since two screens cannot be seamlessly connected at the connection of the two screens, the image will be divided by the connection between the two screens for display, the display is not beautiful and the operation is not convenient. The current processing method mainly avoids the influence of division by displaying the double-screen image on a single screen, which also has obvious defects of failing to fully utilize advantages of a large screen.

An image processing method applied to double screens is provided herein. The image may be displayed on a large screen with the gap between the two screens avoided, the advantage of displaying the image on a large screen can be embodied, and the defect of dividing a main character or item by the gap between the two screens can be avoided.

Figure 4:
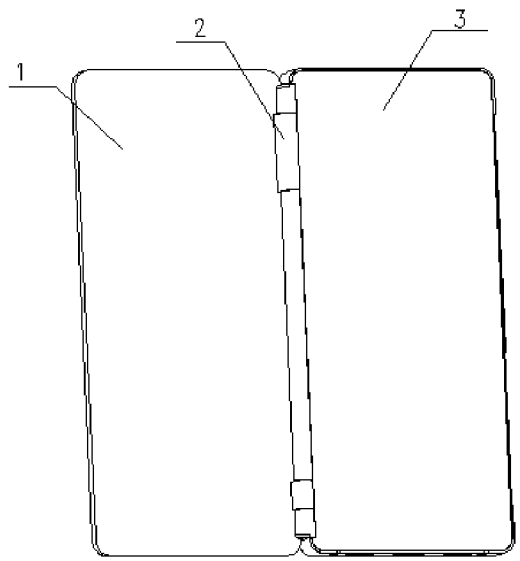
FIG. 4 is a structural diagram of a double-screen mobile phone according to an embodiment of the present application.

FIG. 4 is a structural diagram of a double-screen mobile phone according to an embodiment of the present application.

Reference numeral 1 is defined as a sub-screen, reference numeral 3 is defined as a main screen, and reference numeral 2 is defined as a connecting apparatus connecting the main screen and the sub-screen. That is, two screens cannot be connected seamlessly due to the existence of the connecting apparatus 2 at present, and division occurs when an image is displayed.

Figure 5:
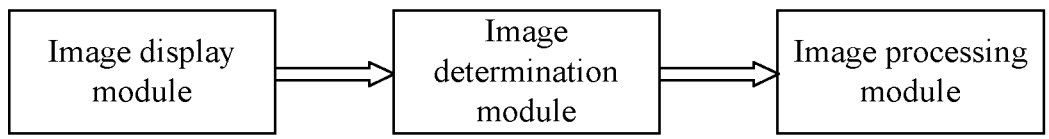
FIG. 5 is a structural block diagram of a system according to an embodiment of the present application.

FIG. 5 is a structural block diagram of a system according to an embodiment of the present application. The system includes an image display module, an image determination module and an image processing module.

The image display module is configured to mainly acquire original image display information to be processed by one or more applications.

The image determination module performs two parts, i.e., preliminary determination and detailed determination, for the image. The preliminary determination includes four steps: 1) plotting areas on two screens; 2) marking coordinates of each pixel; 3) scanning the image of the plotted parts and calculating pixel values; and 4) comparing red green blue (RGB) pixel values of image on two screens according to the coordinate system. The detailed description of each step will be provided later. After the preliminary determination, in the part of the detailed determination, the complete image at the gap between the two screens is determined in an edge detection manner, and the content of the part is described in detail later.

The image processing module is configured to process the determined image which is divided at the gap of two screens, and consider two operation manners of moving and zooming out the image according to different application scenarios.

Figure 6:
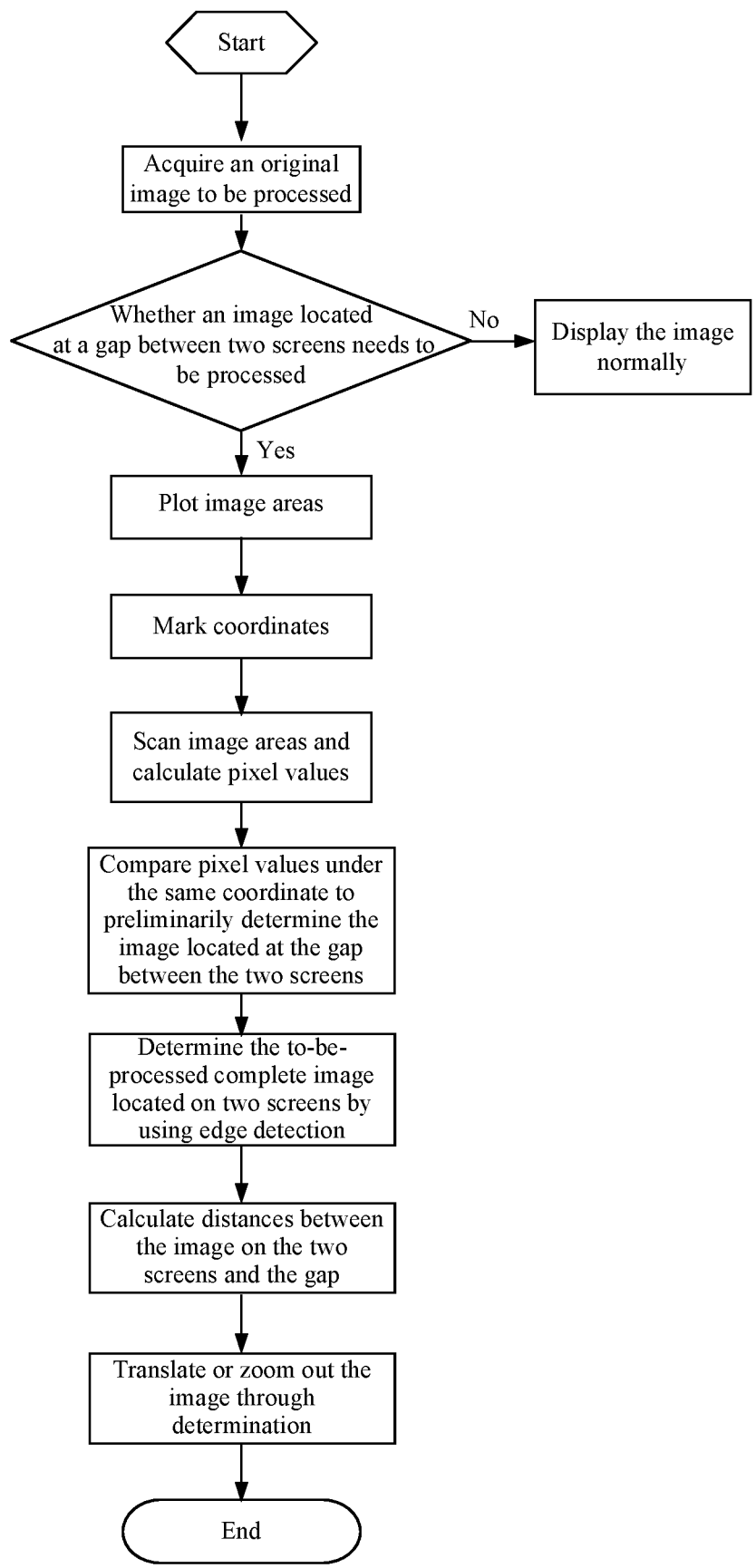
FIG. 6 is a flowchart of an image processing method applied to double screens according to an embodiment of the present application.

An embodiment provides an image processing method applied to double screens. FIG. 6 is a flowchart of an image processing method applied to double screens according to an embodiment of the present application.

Details are described below.

In the first step, an original image to be processed is acquired.

In the embodiment, the original image to be processed is acquired, and the image to be processed may be called out through photos, audio and video or other third-party applications.

In the second step, it is determined whether an image located at a gap between two screens needs to be processed.

In this step, it is determined whether a to-be-processed image exists in which a subject character or thing is divided, if the to-be-processed image exists in which the subject character or thing is divided, the process goes to the next step, and if no to-be-processed image exists in which the subject character or thing is divided, normal display is performed.

Figure 7:
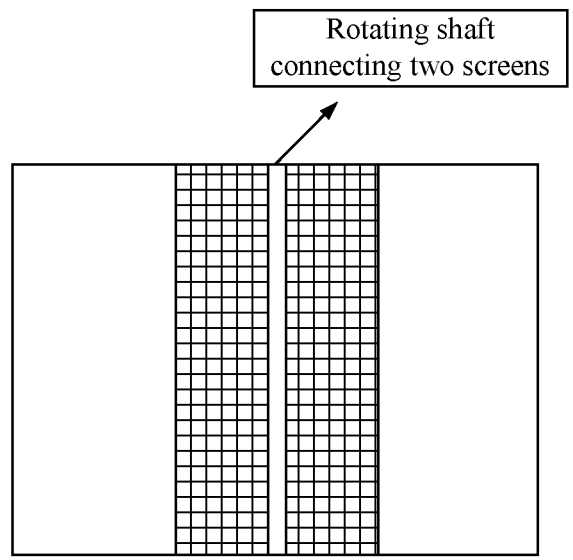
FIG. 7 is a schematic diagram of a one-third filling area of two screens in a portrait manner according to an embodiment.
Figure 8:
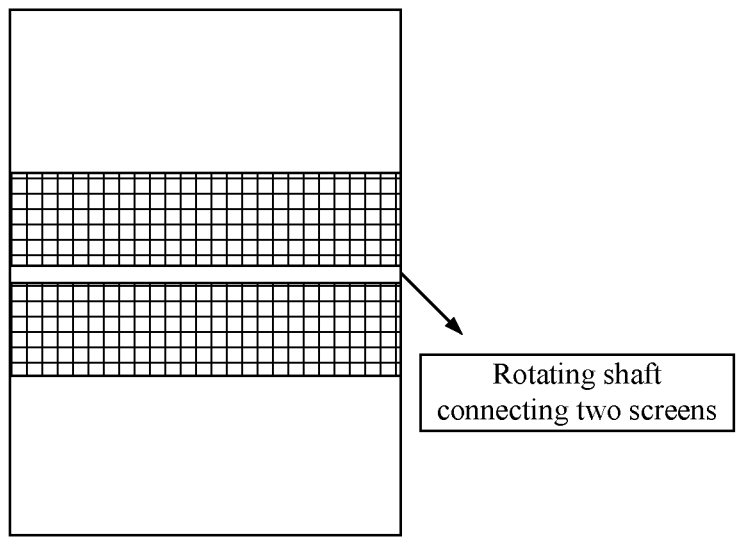
FIG. 8 is a schematic diagram of a one-third filling area of two screens in a landscape manner according to an embodiment.

In the third step, how to preliminarily determine an image divided by the gap between two screens is described below.
1) Area Plotting One third of the areas from the connection of the two screens is plotted for later calculation processing. The divided image is generally located in one third of the areas of the screens, if all the areas are selected for calculation, the amount of calculation is large, and if the selected area is too small, the divided image may not be completely included. FIG. 7 is a schematic diagram of a one-third filling area of two screens in a portrait manner according to an embodiment, and FIG. 8 is a schematic diagram of a one-third filling area of two screens in a landscape manner according to an embodiment.
2) Coordinate System Marking If the double-screen is operated in a portrait manner, the lower left corner is selected as an origin of coordinates to perform pixel point coordinate calibration, FIG. 9 is a schematic diagram of pixel point coordinate calibration with a lower left corner as an origin of coordinates in a portrait mode according to an embodiment, and coordinate calibration is performed on each pixel in the one third areas at left and right; if the double-screen is operated in a landscape manner, the lower left corner is also selected as an origin of coordinates to perform pixel calibration, and FIG. 10 is a schematic diagram of pixel point coordinate calibration with a lower left corner as an origin of coordinates in a landscape mode according to an embodiment.

Figure 9:
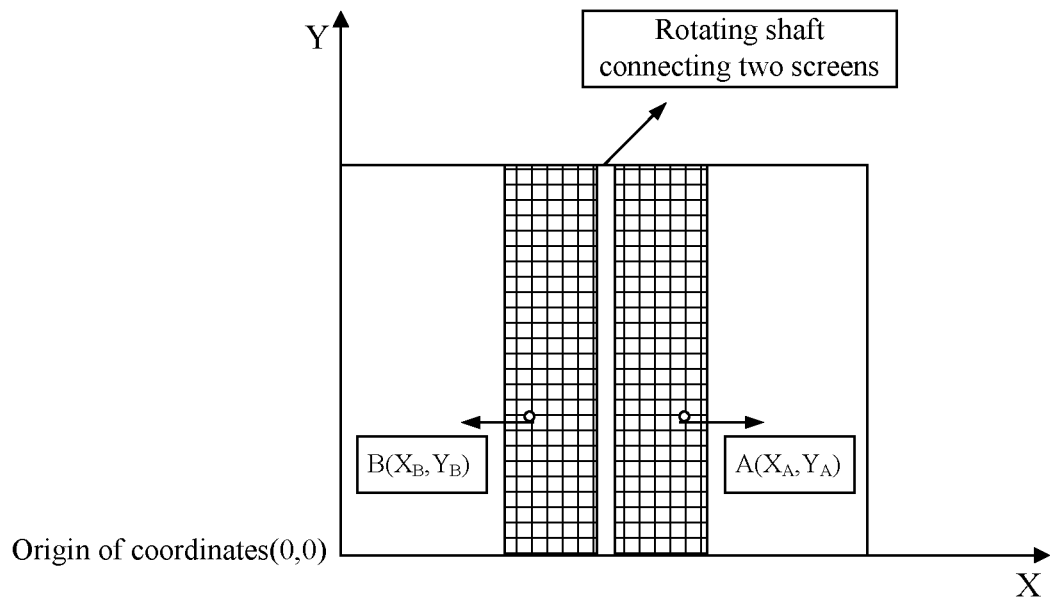
FIG. 9 is a schematic diagram of pixel point coordinate calibration with a lower left corner as an origin of coordinates in a portrait mode according to an embodiment.
Figure 10:
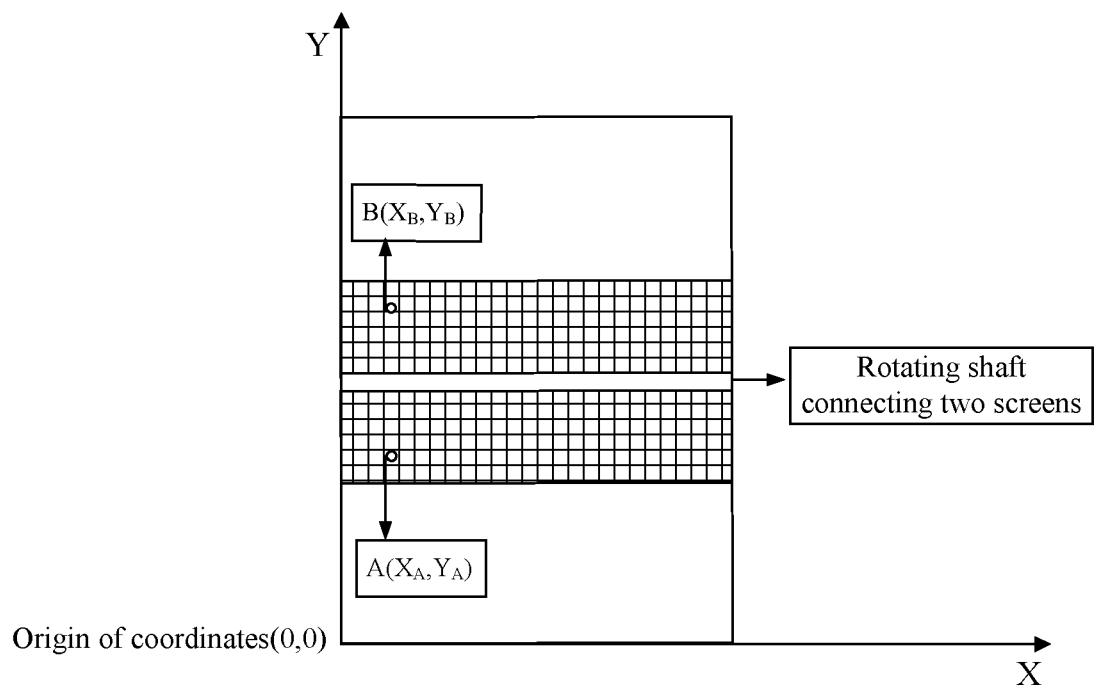
FIG. 10 is a schematic diagram of pixel point coordinate calibration with a lower left corner as an origin of coordinates in a landscape mode according to an embodiment.

For example, FIG. 9 or FIG. 10 shows two coordinate points A and B at the division of two screens, with the calibrated coordinates being $B(X_B, Y_B)$ and $A(X_A, Y_A)$, respectively. Since the ordinates of the two points A and B are located in the same position, $Y_A=Y_B$ actually.

For example, for the two coordinate points A and B at the division of two screens shown in the above figure, the calibrated coordinates are $B(X_B, Y_B)$ and $A(X_A, Y_A)$, respectively. Since the abscissas of the two points A and B are located in the same position, $X_A=X_B$ actually.

Figure 11:
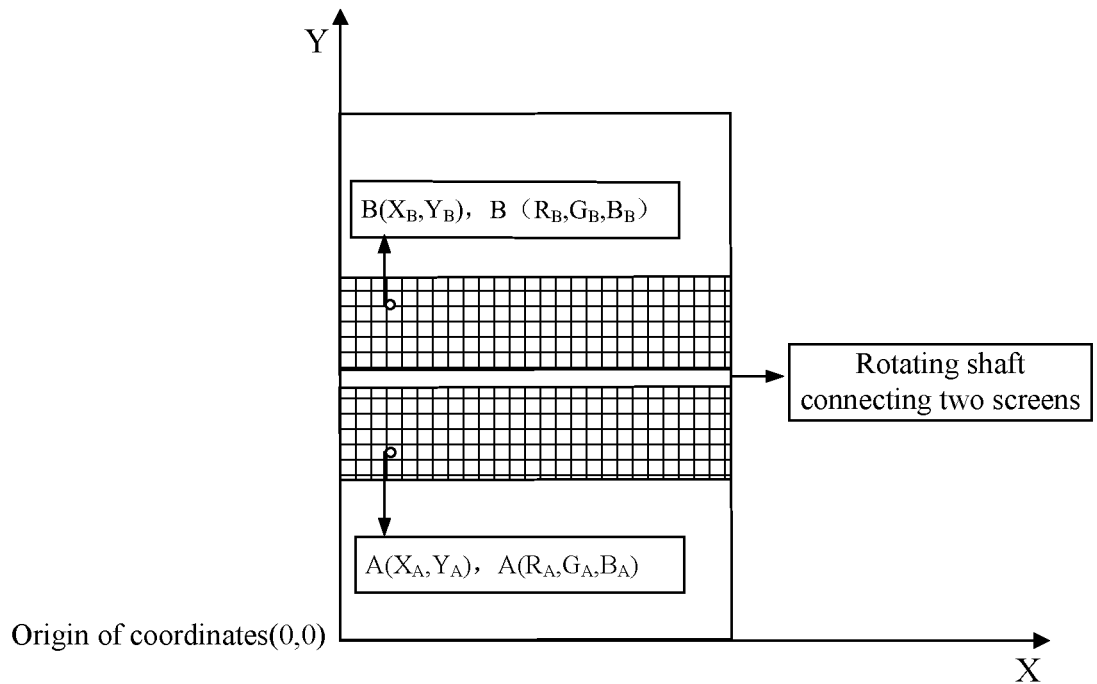
FIG. 11 is a schematic diagram of selecting two points in coordinates for determination under a landscape operation according to an embodiment.

The calibration of the coordinate system as described above is prepared for the subsequent comparison step.
3) Image Scanning and Pixel Calculation Image scanning is performed on one third of the main screen and sub-screen at the position close to the connection between the main screen and the sub-screen, and the RGB value and the corresponding coordinate value of each pixel are marked. In this step, the RGB value of each pixel in one third of the two screens and the corresponding coordinates are calibrated. Still taking the above figure as an example, it is assumed that the RGB value of point A is $A(R_A, G_A, B_A)$ and that the RGB value of point B is $B(R_B, G_B, B_B)$ at this time, and the RGB value of each pixel point is similarly calibrated.
4) Comparison As for the landscape operation, the RGB values on two screens under the same abscissa are compared, and the RGB values of several pixel points near the points under the same abscissa on two screens are compared, and if it is found that the RGB values of the pixels on the left and right sides of the points of two screens under the same abscissa are not very different and that the pixel values of the points on the left and right sides of the points under the same abscissa are not very different, it can be preliminarily determined that a same image is divided on two screens. FIG. 11 is a schematic diagram of selecting two points in coordinates for determination under a landscape operation according to an embodiment. For the portrait operation, the RGB values under the same ordinate are compared in a similar manner.

The specific algorithm is as follows:

$$r1=(R_A-R_B)/256;$$

$$g1=(G_A-G_B)/256;$$

$$b1=(B_A-B_B)/256; \text{ and}$$

$$\text{diff1}=\text{sqrt}(r1*r1+g1*g1+b1*b1).$$

Then other similarity values diff2, diff3 ... diffn (n is the total number of pixels under the same abscissa in one third of the screens) under the same abscissa as that of A and B are calculated in the above manner, where the sqrt( ) function is the square root, r1 is the color value of a red color channel, g1 is the color value of a green color channel, and b1 is the color value of a blue color channel.

$$S1=(\text{diff1}+\text{diff2}+\ldots \text{diff}n)/n; \text{ and}$$

$$Sm=\text{Threshold value}.$$

The larger the value is, the smaller the similarity is. The smaller the value is, the greater the similarity is. S1 is the average similarity.

If S1≤Sm, images on the two sides of the dividing line are similar.

If S1>Sm, the images on the two sides of the dividing line are not similar.

Similarly, similarity values of pixels in several columns on the left and right sides of two points A and B are determined, and if pixels of these columns on the left and right sides are also similar, it can be preliminarily determined that a same image is divided on two screens.

Figure 12:
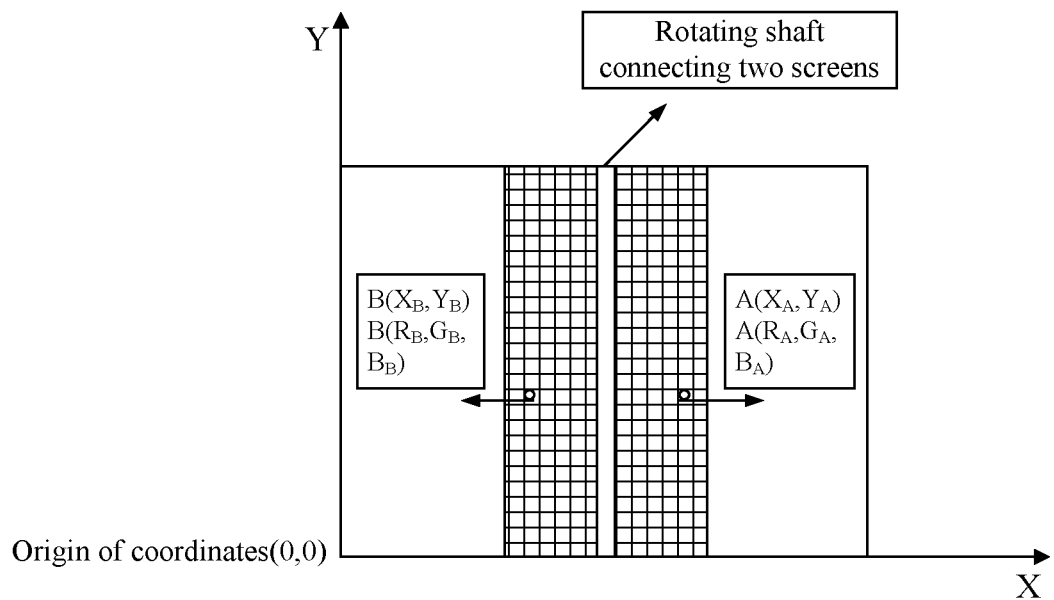
FIG. 12 is a schematic diagram of selecting two points in coordinates for determination under a portrait operation according to an embodiment.

For the portrait operation, the RGB values under the same ordinate are compared in a similar manner as that in the method under the same abscissa, and FIG. 12 is a schematic diagram of selecting two points in coordinates for determination under a portrait operation according to an embodiment.

In the fourth step, how to determine the to-be-processed complete image located on the left screen and the right screen is described below.

Through the comparison in the previous step, it can be preliminarily determined that an image is divided by the two screens, then the complete image divided by the left side and the right side (upper side and lower side in the landscape state) in the portrait state is determined, and the edges of the left image and the right image are calculated through an edge detection method. The basic principle of the edge detection is to use an algorithm to highlight data elements with large numerical value change in the neighborhood of each piece of data in the array while shielding or reducing the grayscale display of adjacent data elements with little change in the neighborhood.

Edge detection is a basic method in image processing and computer vision, the purpose of edge detection is to identify points with obvious brightness change in a digital image, the core of the edge detection algorithm is to highlight the rate of change in an image, edge detection algorithms can be divided into two categories: the first derivative mode (gradient operator) and the second derivative mode, and several common edge detection operators in the first derivative mode are: the Roberts operator, the Sobel operator, and the PreWitt operator. The common edge detection operator in the second derivative mode is the laplacian operator, and the specific edge detection algorithm is introduced as follows:

an edge generally refers to an area where an image changes strongly in intensity locally. The change in intensity may have in the following two cases:

1. Step Change

Figure 13:
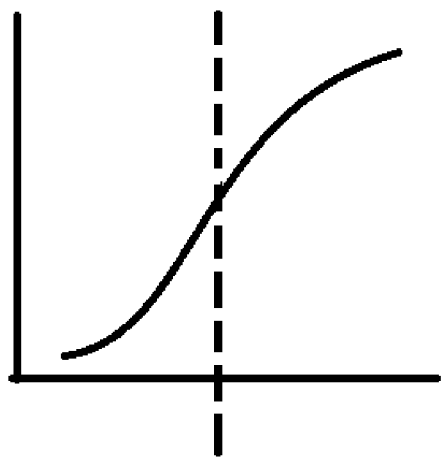
FIG. 13 is a grayscale change diagram of a step change according to an embodiment.

FIG. 13 is a grayscale change diagram of a step change according to an embodiment, with the horizontal axis representing the spatial change, the vertical axis representing the grayscale change, and the dashed line representing the edge: the diagram corresponding to the process of a gradual change from dark to bright.

2. Roof Change

Figure 14:
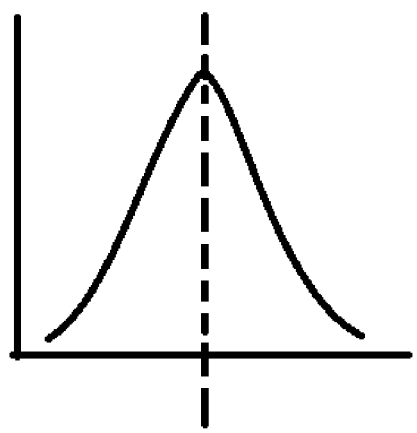
FIG. 14 is a grayscale change diagram of a roof change according to an embodiment.

FIG. 14 is a grayscale change diagram of a roof change according to an embodiment, with the horizontal axis representing the spatial change, the vertical axis representing the grayscale change, and the dashed line representing the edge, the diagram corresponding to the process from dark to bright and then to dark.

The task of edge detection is to find a set of pixel points with a step change or a roof change. The basic principle of edge detection is as follows: since the edge is the position where the grayscale changes most violently, the most intuitive idea is to perform differential.

For the first case, the peak value of the first-order differential is the edge point, and the zero point of the second-order differential is the edge point.

For the second case, the zero point of the first-order differential is the edge point, and the peak value of the second-order differential is the edge point.

With the first-order differential method, a gradient operator is defined. The gradient is a vector indicating the direction in which the grayscale of an image changes most violently.

$$\nabla f = \left(\frac{\partial f}{\partial x}, \frac{\partial f}{\partial y}\right).$$

The magnitude of the gradient is as follows:

$$\|\nabla f\| = \sqrt{\left(\frac{\partial f}{\partial x}\right)^2 + \left(\frac{\partial f}{\partial y}\right)^2}.$$

The direction of the gradient is as follows:

$$\theta = \left(\frac{\partial f/\partial y}{\partial f/\partial x}\right).$$

$$\frac{\partial f}{\partial x}$$

represents a partial derivative in the x direction, $$\frac{\partial f}{\partial y}$$

represents a partial derivative in the y direction, ∇f represents a gradient, ‖∇f‖ represents the modulus of the gradient, θ represents a gradient direction, x represents an abscissa of a pixel point, and y represents an ordinate of the pixel point. In actual image processing, a difference method can be used for calculation. However, if the difference method is used to perform edge detection, the direction of difference and the direction of an edge have to be perpendicular to each other, so the difference operation has to be performed on different directions of the image, which increases the amount of calculation. Edges can generally be divided into a horizontal edge, a vertical edge, and a diagonal edge.

1. Roberts Operator

The Roberts gradient operator uses the difference between two adjacent pixel values in the diagonal direction as a measurement standard, and the calculation method is as follows:

$$G_x = f(i,j) - f(i-1,j-1)$$

$$G_y = f(i-1,j) - f(i,j-1) \text{ and}$$

$$|G(x,y)| = \sqrt{G_x^2 + G_y^2}.$$

$G_x$ and $G_y$ represent crossover gradient operators and $|G(x,y)|$ represents a gradient.

If written in the form of a convolution operation, the convolution kernels are as follows:

$$G_x = \begin{bmatrix} -1 & 0 \\ 0 & 1 \end{bmatrix} \quad G_y = \begin{bmatrix} 0 & -1 \\ 1 & 0 \end{bmatrix}.$$

2. Prewitt Operator

The prewitt operator combines difference operation with neighborhood average. The convolution template is as follows:

$$G_x = \begin{bmatrix} -1 & 0 & 1 \\ -1 & 0 & 1 \\ -1 & 0 & 1 \end{bmatrix} \quad G_y = \begin{bmatrix} -1 & -1 & -1 \\ 0 & 0 & 0 \\ 1 & 1 & 1 \end{bmatrix}.$$

3. Sobel Operator

The sobel operator is similar to the prewitt operator, but considering that the influence degree of different adjacent pixels is different, weighted average is adopted. The convolution template is as follows:

$$G_x = \begin{bmatrix} -1 & 0 & 1 \\ -2 & 0 & 2 \\ -1 & 0 & 1 \end{bmatrix} \quad G_y = \begin{bmatrix} -1 & 2 & -1 \\ 0 & 0 & 0 \\ 1 & 2 & 1 \end{bmatrix}.$$

4. Laplacian Operator

The laplacian operators are some operators using second-order differentials, which are actually the divergence of gradients.

The second-order differential is as follows:

$$\nabla^2 f = \frac{\partial^2 f}{\partial x^2} + \frac{\partial^2 f}{\partial y^2} \text{ while}$$

$$\frac{\partial^2 f}{\partial x^2} = f(x, y+1) - 2f(x, y) + f(x, y-1) \text{ and}$$

$$\frac{\partial^2 f}{\partial y^2} = f(x+1, y) - 2f(x, y) + f(x-1, y).$$

Therefore the convolution template is written as follows:

$$\nabla^2 f \approx \begin{pmatrix} 0 & 1 & 0 \\ 1 & -4 & 1 \\ 0 & 1 & 0 \end{pmatrix}.$$

$$\frac{\partial^2 f}{\partial x^2}$$

represents the second-order partial derivative in the X direction and $$\frac{\partial^2 f}{\partial y^2}$$

represents the second-order partial derivative in the Y direction.

Figure 15:
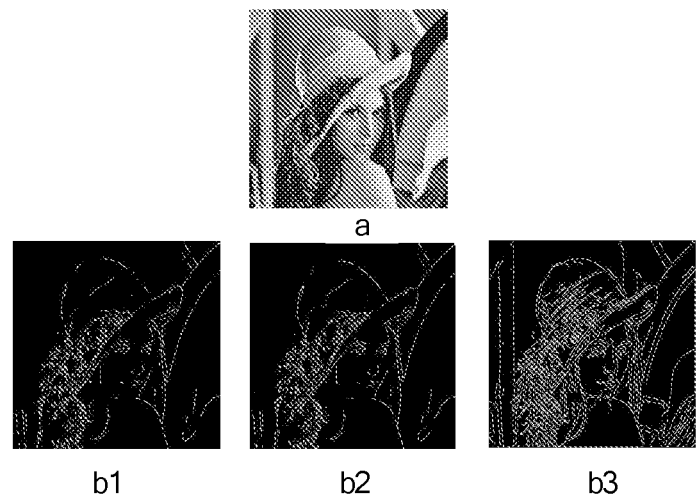
FIG. 15 shows an original image and effect diagrams of the original image processed by various edge detection operators according to an embodiment.

FIG. 15 shows an original image and effect diagrams of the original image processed by various edge detection operators according to an embodiment, where a corresponds to the original image, b1 corresponds to the prewitt operator, b2 corresponds to the sobel operator, and b3 corresponds to the laplacian operator.

The test results of the above edge detection are used.

Edges of the main to-be-processed image located at the gap between the left and right screens are detected through the edge detection algorithm.

In the fifth step, distances between the image on the two screens and the gap are calculated.

The image divided by the gap between the two screens is determined through the previous two steps, and by taking the screen in the portrait manner as an example, the distance between an image on the left screen and the middle (gap) of (between) screens is calculated, the D1 value of the longest distance is found out, the distance between an image on the right screen and the middle (gap) of (between) the screens is also calculated, and the D2 value of the longest distance is found out.

Figure 16:
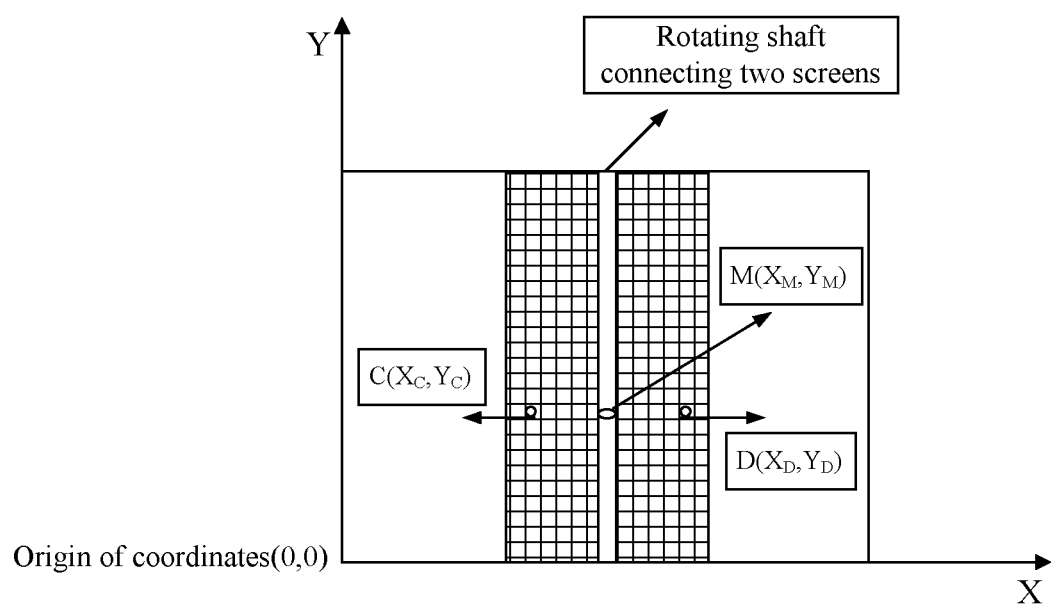
FIG. 16 is a schematic diagram of calculating distances between an image on two screens and a gap according to an embodiment.

Taking the screen in a portrait manner as an example, if an edge detection algorithm in the fourth step is used to have detected that the pixel point on the left screen farthest from the connection shaft between the two screens is $C(X_C, Y_C)$, and that the pixel point on the right screen farthest from the connection shaft between the two screens is $D(X_D, Y_D)$, and $M(X_M, Y_M)$ are coordinates of a point at the connection between the two screens, and if the ordinates of the two pixel points on the left screen and the right screen are not consistent, the distance between the pixel point having the same ordinate as that of the pixel point at the connection between the two screens is calculated. FIG. 16 is a schematic diagram of calculating distances between an image on two screens and a gap according to an embodiment.

A distance from C to the middle of the two screens is calculated to be D1, and a distance from D to the middle of the two screens is calculated to be D2.

$$|D1|=\sqrt{(X_C-X_M)^2+(Y_C-Y_M)^2};\text{ and}$$

$$|D2|=\sqrt{(X_D-X_M)^2+(Y_D-Y_M)^2}.$$

If it is determined that D1<D2, the divided image may be moved by a distance of D1.

Similarly, determination may also be performed in a similar way when the screen is in a landscape manner.

In the sixth step, the image is translated or zoomed out through determination.

The values of D1 and D2 are compared in the fifth step, the distances from the divided image (such as a person or an item) to the middle of the two screens are determined, and the whole image is moved. If the value of D2 is large, the divided image may be uniformly moved towards left by a distance of D1, and may of course also be uniformly moved towards right by a distance of D2. In comparison, the distance moved towards left is short; therefore, it is suggested that a short-distance movement is mainly adopted, and through the processing, the defect that a main character or an item is divided by a gap between two screens can be avoided.

Alternatively, the image may also be zoomed out to avoid being divided by a gap between two screens, the image is zoomed out by D1/(D1+D2) to be placed on the left screen, or the image is zoomed out by D2/(D1+D2) to be placed on the right screen for display.

The user experience can be greatly improved. When an image is displayed on a double-screen large screen, the user can manually select a translation mode or a zoom-out mode for display according to the displayed image. In the following two embodiments, an image is displayed according to the translation processing in the first embodiment, and an image is displayed according to the zoom-out processing in the second embodiment.

Figure 17:
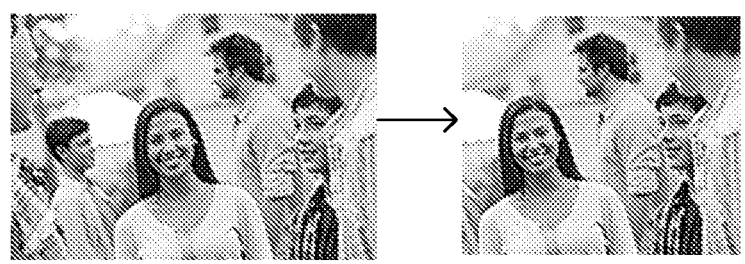
FIG. 17 is a schematic diagram of display in accordance with translation processing according to an embodiment.

FIG. 17 is a schematic diagram of display in accordance with translation processing according to an embodiment. Before being processed, the image is the left image of FIG. 17; after being processed, the image is the right image of FIG. 17. After translation processing herein, the main person can be ensured to finally be displayed.

Figure 18:
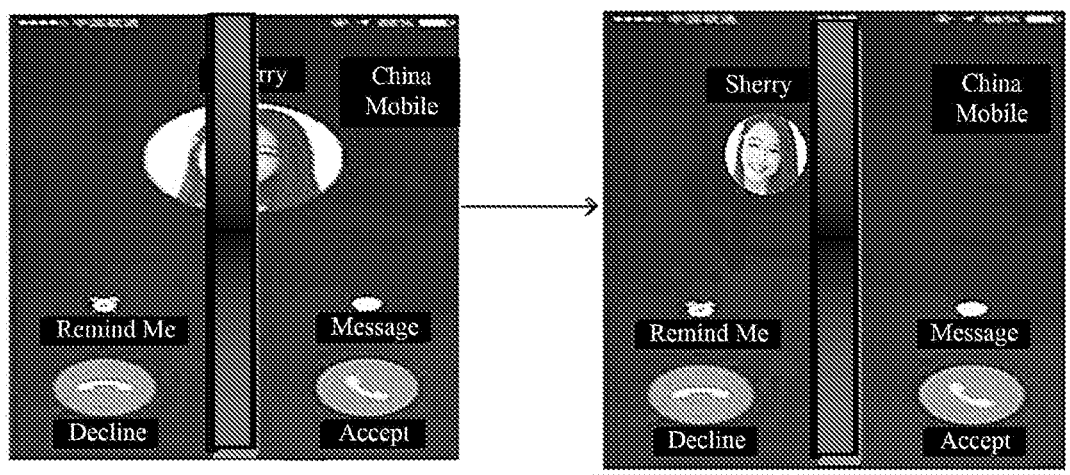
FIG. 18 is a schematic diagram of display in accordance with zoom-out processing according to an embodiment.

FIG. 18 is a schematic diagram of display in accordance with zoom-out processing according to an embodiment. The double-screen display of an original image for an incoming call is shown on the left side of FIG. 18, and the head of a person is divided into two sides. According to the embodiment, a user may perform processing and display in a translation mode or a zoom-out mode, and the user chooses to perform display in the zoom-out mode, as shown on the right side of FIG. 18.

As can be seen from FIGS. 17 and 18, the gap between two screens can be well avoided, and the image divided by the gap between two screens can be well displayed on the basis of the advantage that the large screen is fully utilized.

At present, an avoidance mode, which is mainly adopted for displaying an image on a large screen, has final processing of displaying the image on a single screen. For example, in the application of photos, a preview image is mainly displayed on one screen and a complete large image is displayed on the other screen, so that the gap between two screens can be avoided. Other applications also mainly adopt the avoidance mode to enable the image to be displayed merely on one screen, which also has obvious defects. The advantages of a large screen are not fully utilized, and the photo is still displayed on a single screen. According to the embodiment, for double-screen image display, the image is not displayed merely on one screen and can be displayed on the large screen with avoiding the gap between the two screens. According to the present disclosure, the image can be displayed on the large screen and the gap between the two screens is avoided, the advantage of displaying the image on the large screen is embodied, and the defect that a main character or item is divided by the gap between the two screens can be avoided.

According to the embodiment, the advantage of displaying an image on the double-screen large screen can be fully utilized, the defect that a main character or item is divided by a gap between the two screens can be avoided, and no extra high cost needs to be added for the hardware used in the embodiment.

The embodiment can be used in similar applications related to displaying an image, such as in applications of photos, audio and video, incoming call portrait display, camera, game and the like in double-screen projects.

Embodiment Four

An embodiment of the present application further provides a storage medium. In the embodiment, the storage medium may be configured to store program codes for performing the steps described below.

In S1, it is determined that an original image is to be displayed on a dividing line between two display screens.

In S2, a complete display picture of the original image is acquired, and distances from boundaries of the original image to the dividing line are calculated.

In S3, a display position of the original image on the two display screens is adjusted according to the distances, and the complete display picture of the original image is displayed according to the adjusted display position.

In this embodiment, the storage medium may include, but is not limited to, a universal serial bus flash disk, a read-only memory (ROM), a random access memory (RAM), a mobile hard disk, a magnetic disk, an optical disk or another medium capable of storing program codes.

In the embodiment, a processor performs the following operations according to the program codes stored in the storage medium.

It is determined that an original image is to be displayed on a dividing line between two display screens.

A complete display picture of the original image is acquired, and distances from boundaries of the original image to the dividing line are calculated.

A display position of the original image on the two display screens is adjusted according to the distances, and the complete display picture of the original image is displayed according to the adjusted display position.

For specific examples in the embodiment, reference may be made to the examples described in the above-mentioned embodiments and optional other embodiments, and repetition will not be made in the embodiment.

It is to be understood by those skilled in the art that each of the above-mentioned modules or steps of the present application may be implemented by a general-purpose computing apparatus, the modules or steps may be concentrated on a single computing apparatus or distributed on a network composed of multiple computing apparatuses, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. An image processing method for displaying an image between two display screens, comprising:
   determining that an original image is to be displayed on a dividing line between two display screens; acquiring a complete display picture of the original image, and calculating distances from boundaries of the original image to the dividing line; and
   adjusting a display position of the original image on the two display screens according to the distances, and displaying the complete display picture of the original image according to the adjusted display position;
   wherein calculating the distances from the boundaries of the original image to the dividing line comprises:
      separately determining a first boundary of the original image on a first display screen and a second boundary of the original image on a second display screen; and
      calculating a first farthest distance among distances from all pixel points on the first boundary to the dividing line, and calculating a second farthest distance among distances from all pixel points on the second boundary to the dividing line.

2. The method of claim 1, wherein the original image is a partial image comprised in a large-screen display image and divided at the dividing line between the two display screens, and the large-screen display image is an image displayed on the two display screens.

3. The method of claim 2, wherein the two display screens are a first display screen and a second display screen, respectively;
   wherein determining that the original image is to be displayed on the dividing line between the two display screens comprises:
      plotting a first filling area of a predetermined size on the first display screen and plotting a second filling area of a predetermined size on the second display screen;
      calculating similarity of a first pixel point in the first filling area and a second pixel point in the second filling area; and
      in response to determining that the similarity is smaller than a preset threshold value, determining that the original image is to be displayed on the dividing line between the first display screen and the second display screen.

4. The method of claim 3, wherein the first pixel point and the second pixel point are pixel points symmetrical with respect to the dividing line as a center line.

5. The method of claim 2, wherein acquiring the complete display picture of the original image comprises:
   using an edge detection method to calculate edge areas of the original image on two sides of the dividing line, restore display pictures of the original image in the edge areas on the two sides of the dividing line, and splice the display pictures to obtain the complete display picture of the original image.

6. The method of claim 2, wherein adjusting the display position of the original image on the two display screens according to the distances, and displaying the complete display picture of the original image according to the adjusted display position comprise one of:
   moving, according to the calculated second farthest distance, the display position of the original image on the two display screens towards the first display screen by the second farthest distance so that the complete display picture of the original image is displayed on the first display screen;
   moving, according to the calculated first farthest distance, the display position of the original image on the two display screens towards the second display screen by the first farthest distance so that the complete display picture of the original image is displayed on the second display screen;
   zooming out the original image by D1/(D1+D2), and displaying the complete display picture of the original image on the first display screen; or
   zooming out the original image by D2/(D1+D2), and displaying the complete display picture of the original image on the second display screen;
wherein D1 is the first farthest distance and D2 is the second farthest distance.

7. The method of claim 1, wherein the two display screens are a first display screen and a second display screen, respectively;
   wherein determining that the original image is to be displayed on the dividing line between the two display screens comprises:
      plotting a first filling area of a predetermined size on the first display screen and plotting a second filling area of a predetermined size on the second display screen;
      calculating similarity of a first pixel point in the first filling area and a second pixel point in the second filling area; and
      in response to determining that the similarity is smaller than a preset threshold value, determining that the original image is to be displayed on the dividing line between the first display screen and the second display screen.

8. The method of claim 7, wherein the first pixel point and the second pixel point are pixel points symmetrical with respect to the dividing line as a center line.

9. The method of claim 1, wherein acquiring the complete display picture of the original image comprises:
   using an edge detection method to calculate edge areas of the original image on two sides of the dividing line, restore display pictures of the original image in the edge areas on the two sides of the dividing line, and splice the display pictures to obtain the complete display picture of the original image.

10. The method of claim 1, wherein adjusting the display position of the original image on the two display screens according to the distances, and displaying the complete display picture of the original image according to the adjusted display position comprise one of:
    moving, according to the calculated second farthest distance, the display position of the original image on the two display screens towards the first display screen by the second farthest distance so that the complete display picture of the original image is displayed on the first display screen;
    moving, according to the calculated first farthest distance, the display position of the original image on the two display screens towards the second display screen by the first farthest distance so that the complete display picture of the original image is displayed on the second display screen;

zooming out the original image by D1/(D1+D2), and displaying the complete display picture of the original image on the first display screen; or zooming out the original image by D2/(D1+D2), and displaying the complete display picture of the original image on the second display screen;

wherein D1 is the first farthest distance and D2 is the second farthest distance.

11. A processor, which is configured to execute programs, and the programs are configured to, when executed by the processor, execute the method of claim 1.

12. An image processing apparatus for displaying an image between two display screens, comprising:
a processor; and
a memory for storing instructions executable by the processor,
wherein when executing the instructions, the processor is configured to:
determine that an original image is to be displayed on a dividing line between two display screens;
acquire a complete display picture of the original image, and calculate distances from boundaries of the original image to the dividing line; and
adjust a display position of the original image on the two display screens according to the distances, and display the complete display picture of the original image according to the adjusted display position;
wherein the processor is further configured to:
separately determine a first boundary of the original image on a first display screen and a second boundary of the original image on a second display screen; and
calculate a first farthest distance among distances from all pixel points on the first boundary to the dividing line, and calculate a second farthest distance among distances from all pixel points on the second boundary to the dividing line.

13. The apparatus of claim 12, wherein the original image is a partial image comprised in a large-screen display image and divided at the dividing line between the two display screens, and the large-screen display image is an image displayed on the two display screens.

14. The apparatus of claim 12, wherein the two display screens are a first display screen and a second display screen, respectively;
wherein the processor is configured to:
plot a first filling area of a predetermined size on the first display screen and plot a second filling area of a predetermined size on the second display screen;
calculate similarity of a first pixel point in the first filling area and a second pixel point in the second filling area; and
in response to determining that the similarity is smaller than a preset threshold value, determine that the original image is to be displayed on the dividing line between the first display screen and the second display screen.

15. The apparatus of claim 12, wherein the processor is configured to use an edge detection method to calculate edge areas of the original image on two sides of the dividing line, restore display pictures of the original image in the edge areas on the two sides of the dividing line, and splice the display pictures to obtain the complete display picture of the original image.

16. The apparatus of claim 12, wherein the processor is configured to:
move the display position of the original image on the two display screens towards the first display screen by the second farthest distance according to the calculated second farthest distance so that the complete display picture of the original image is displayed on the first display screen;
move the display position of the original image on the two display screens towards the second display screen by the first farthest distance according to the calculated first farthest distance so that the complete display picture of the original image is displayed on the second display screen;
zoom out the original image by D1/(D1+D2) and display the complete display picture of the original image on the first display screen; or
zoom out the original image by D2/(D1+D2) and display the complete display picture of the original image on the second display screen;
wherein D1 is the first farthest distance and D2 is the second farthest distance.

17. A non-transitory computer-readable storage medium for storing computer programs, and the computer programs are configured to, when executed by a processor, implement an image processing method comprising:
determining that an original image is to be displayed on a dividing line between two display screens; acquiring a complete display picture of the original image, and calculating distances from boundaries of the original image to the dividing line; and
adjusting a display position of the original image on the two display screens according to the distances, and displaying the complete display picture of the original image according to the adjusted display position;
wherein calculating the distances from the boundaries of the original image to the dividing line comprises:
separately determining a first boundary of the original image on a first display screen and a second boundary of the original image on a second display screen; and
calculating a first farthest distance among distances from all pixel points on the first boundary to the dividing line, and calculating a second farthest distance among distances from all pixel points on the second boundary to the dividing line.

* * * * *